(12) United States Patent
Liu et al.

(10) Patent No.: US 12,230,028 B1
(45) Date of Patent: Feb. 18, 2025

(54) INTEGRATED HYPERSPECTRAL STEREOSCOPIC REMOTE SENSING, TRACING AND PREDICTION OF GREENHOUSE/POLLUTION GAS

(71) Applicant: UNIVERSITY OF SCIENCE AND TECHNOLOGY OF CHINA, Hefei (CN)

(72) Inventors: Cheng Liu, Hefei (CN); Chengzhi Xing, Hefei (CN); Qihua Li, Hefei (CN); Wei Tan, Hefei (CN); Haoran Liu, Hefei (CN); Xiangguang Ji, Hefei (CN); Qihou Hu, Hefei (CN)

(73) Assignee: UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 0 days.

(21) Appl. No.: 18/814,292

(22) Filed: Aug. 23, 2024

(30) Foreign Application Priority Data

Aug. 24, 2023 (CN) .......................... 202311073299.9

(51) Int. Cl.
*G06V 20/13* (2022.01)
*G06V 20/10* (2022.01)
*G06V 20/17* (2022.01)

(52) U.S. Cl.
CPC ............ *G06V 20/194* (2022.01); *G06V 20/13* (2022.01); *G06V 20/17* (2022.01)

(58) Field of Classification Search
CPC ...... G06V 20/194; G06V 20/17; G06V 20/13; G06V 10/806; G06V 10/82; G01N 21/17;
(Continued)

(56) References Cited

U.S. PATENT DOCUMENTS

2013/0128271 A1* 5/2013 Smith ................ G01N 21/3504
356/437
2014/0055281 A1* 2/2014 Weng ..................... G01D 4/002
340/870.02
(Continued)

FOREIGN PATENT DOCUMENTS

CN 111579504 8/2020
CN 114324226 4/2022

*Primary Examiner* — Syed Haider
(74) *Attorney, Agent, or Firm* — Jiwen Chen; Joywin IP Law PLLC

(57) ABSTRACT

Disclosed in the present invention is a method for whole-time space-air-ground integrated hyperspectral stereoscopic remote sensing, tracing and prediction of greenhouse/pollution gas, comprising: performing remote sensing of multi-source heterogeneous data: utilizing a hyperspectral stereoscopic remote sensing device, a hyperspectral imaging device, a hyperspectral unmanned aerial vehicle remote sensing device, a hyperspectral greenhouse gas remote sensing device based on grating light splitting and a night hyperspectral stereoscopic remote sensing device to perform the remote sensing of the multi-source heterogeneous greenhouse/pollution gas data; performing tracing and early warning of greenhouse/pollution gas components: progressively realizing tracing of greenhouse/pollution gas components at different locations based on the multi-source heterogeneous greenhouse/pollution gas data, and performing emission early warning according to a traced result; and performing stereo fusion and prediction of the multi-source heterogeneous data: performing data feature fusion based on the multi-source heterogeneous greenhouse/pollution gas data, and performing prediction of the greenhouse/pollution gas components at a future moment based on a fusion result. The system can complement the deficiencies of existing greenhouse/pollution gas monitoring and tracing technologies.

6 Claims, 6 Drawing Sheets

(58) Field of Classification Search
CPC .... G01N 21/25; G06Q 30/0185; G06Q 10/04; G06Q 50/26
See application file for complete search history.

(56) References Cited

U.S. PATENT DOCUMENTS

| | | | | |
|---|---|---|---|---|
| 2016/0214715 | A1* | 7/2016 | Meffert | B64U 20/87 |
| 2018/0292374 | A1* | 10/2018 | Dittberner | G08G 5/0086 |
| 2020/0232963 | A1* | 7/2020 | Zelinski | G01J 3/2823 |
| 2021/0382475 | A1* | 12/2021 | Smith | G01N 33/0016 |
| 2022/0065834 | A1* | 3/2022 | Gadot | G01N 33/0047 |
| 2023/0316691 | A1* | 10/2023 | Giron | G06V 20/194 |
| | | | | 382/103 |

\* cited by examiner

INTEGRATED HYPERSPECTRAL STEREOSCOPIC REMOTE SENSING, TRACING AND PREDICTION OF GREENHOUSE/POLLUTION GAS

This application claims priority of Chinese Application No. 2023110732999. Aug. 24, 2023, which is hereby incorporated by reference.

FIELD OF TECHNOLOGY

The present invention belongs to the technical field of environmental monitoring, and in particular relates to a method for whole-time space-air-ground integrated hyperspectral stereoscopic remote sensing, tracing and prediction of greenhouse/pollution gas.

BACKGROUND TECHNOLOGY

Controlling emissions of greenhouse gases and pollution gases is an important way to solve the two major environmental problems of air pollution and climate change. The greenhouse/pollution gases are characterized by complex emission sources, uneven regional distribution and frequent transmission, and a hyperspectral stereoscopic remote sensing technology has obvious technical advantages in quantifying the spatial concentration distribution of multi-component greenhouse/pollution gas and supporting researches of air physicochemical mechanisms.

Significant changes have also taken place in the emission sources, emission components and emission concentrations of greenhouse/pollution gases, and work of pollution tracing has become more and more difficult, and the uncertainties of tracing methods based on in-situ observation and atmospheric chemical models would be further amplified. Therefore, it is urgent to establish a new system of greenhouse/pollution gas tracing and prediction technology based on hyperspectral stereoscopic remote sensing and monitoring technology.

Although there are also some detection methods for greenhouse/pollution gases, such as an inversion method of vertical distribution of air pollution components based on optical remote sensing disclosed in a patent document 202010611508.0, this method uses a solar scattering spectrum obtained from a plurality of directions as a data source to obtain a total slant of air pollution components. The vertical distribution of air pollution components is obtained by iterative inversion with an iterative objective function and a value function constructed according to the total slant, which ensures the rationality and reliability of an inversion result, and also realizes a self-calibration of the inversion result. For example, disclosed in a patent document 202111441393.6 is an unmanned aerial vehicle-borne hyperspectral remote sensing system for stereo distribution of air pollutants, wherein a GPS recorder collects GPS data; a stable earth-scanning system collects real-time earth surface reflection and sky solar scattering light signals, earth surface environmental parameters and high-definition image data; an air component hyperspectral system splits, detects optical signals and converts them into hyperspectral data for storage, and stores the GPS data, the earth surface environmental parameters and the high-definition image data; a ground control system controls a flight height and route without pedestrian, and controls a collection range and frequency of the optical signals, the earth surface environmental parameters and the image data; a data backhaul and analysis system determines stereo distribution information of air pollutants according to inversion analysis of the hyperspectral data and earth surface environmental parameters, and displays it in combination with the high-definition image data, which can identify high-resolution stereo distribution information of pollutants and accurately trace locations of pollution sources. But these detection methods are one-sided, do not constitute a system, and are difficult to meet application needs.

SUMMARY OF THE INVENTION

An object of the present invention is to provide a method for whole-time space-air-ground integrated hyperspectral stereoscopic remote sensing, tracing and prediction of greenhouse/pollution gas so as to complement the deficiencies of existing greenhouse/pollution gas monitoring and tracing technologies.

For the above object of the present invention, provided in an embodiment of the present invention is a method for whole-time space-air-ground integrated hyperspectral stereoscopic remote sensing, tracing and prediction of greenhouse/pollution gas, comprising:

performing remote sensing of multi-source heterogeneous data: utilizing a hyperspectral stereoscopic remote sensing device, a hyperspectral imaging device, a hyperspectral unmanned aerial vehicle remote sensing device, a hyperspectral greenhouse gas remote sensing device based on grating light splitting and a night hyperspectral stereoscopic remote sensing device to perform the remote sensing of and obtaining the multi-source heterogeneous greenhouse/pollution gas data;

performing tracing and early warning of greenhouse/pollution gas components: progressively realizing tracing of greenhouse/pollution gas components at different locations based on the multi-source heterogeneous greenhouse/pollution gas data, and performing emission early warning according to a traced result;

performing stereo fusion and prediction of the multi-source heterogeneous data: performing data feature fusion based on the multi-source heterogeneous greenhouse/pollution gas data, and performing prediction of the greenhouse/pollution gas components at a future moment based on a fusion result.

Preferably, the hyperspectral stereoscopic remote sensing device is capable of obtaining a vertical profile of the greenhouse/pollution gas, wherein a vertical resolution of the vertical profile is 1 m to 100 m, a time resolution is ≤15 min, and the hyperspectral stereoscopic remote sensing device is also capable of obtaining a horizontal distribution of 0° to 360° of the greenhouse/pollution gas, wherein observation exposure time of a single azimuth angle is ≤3 seconds;

the hyperspectral imaging device is capable of realizing imaging of the greenhouse/pollution gas from a critical emission source, wherein a spatial resolution is up to a meter-level, and scanning time of a single grid point is ≤3 seconds;

the hyperspectral unmanned aerial vehicle remote sensing device is capable of obtaining a horizontal distribution of a meter-level resolution of the greenhouse/pollution gas in a critical area, wherein an observation time resolution is ≤30 min;

the hyperspectral greenhouse gas remote sensing device based on the grating light splitting is capable of obtaining a vertical column concentration and a vertical profile of $CO_2$ and $CH_4$, wherein a spatial resolution of the profile is of a kilometer-level, and a time resolution is ≤10 min; and the night hyperspectral stereoscopic remote sensing device is capable of obtaining a horizontal distribution and a vertical distribution of greenhouse/pollution gas at night, wherein a horizontal and vertical spatial resolution thereof is ≤10 m, and a time resolution is ≤30 min.

Preferably, progressively realizing tracing of greenhouse/pollution gas components at different locations based on the multi-source heterogeneous greenhouse/pollution gas data comprises:

step 1: realizing kilometer-level identification of the greenhouse/pollution gas components based on a hyperspectral satellite payload remote sensing technology;

step 2: in a kilometer-level greenhouse/pollution gas component high value area determined by satellite payload remote sensing, carrying out hyperspectral horizontal remote sensing to realize hundred-meter-level horizontal distribution detection and high-value orientation identification of the greenhouse/pollution gas components;

step 3: in a hundred-meter-level greenhouse/pollution gas component high value grid point determined by horizontal remote sensing, carrying out hyperspectral unmanned aerial vehicle remote sensing to realize meter-level resolution detection of the greenhouse/pollution gas components and determination of a location of an emission source; and step 4: at the location of the emission source determined by unmanned aerial vehicle remote sensing, carrying out hyperspectral imaging remote sensing to identify greenhouse/pollution gas components, emission fluxes and a diffusion range of the emission source, so as to realize accurate tracing of the greenhouse/pollution gas components.

Preferably, in step 2, hyperspectral horizontal remote sensing is realized based on an effective optical path calculation algorithm of $O_4$ optical characteristics changes.

Preferably, in step 3, a threshold digital filtering algorithm and a bicubic B-spline surface data processing algorithm are fused to realize a reconstruction of the horizontal distribution of the greenhouse/pollution gas.

Preferably, in step 4, after a Retinex algorithm, a median filtering algorithm and a Gaussian fuzzy algorithm are fused to process the data, a plume refinement reconstruction algorithm is used to realize high-precision identification of a plume boundary and an internal concentration.

Preferably, performing emission early warning according to a traced result comprises:

constructing a multi-source data traversal method system and a multi-component historical excessive emission data lookup table of the greenhouse/pollution air components based on an emission specification standard and historical emission data of a target source, wherein the lookup table includes time, process flow names, pollution/greenhouse gas components and corresponding excessive emission concentrations, and determination of excessive emission is based on the emission specification standard;

establishing an excessive emission early warning solution having three levels of orange, red and purple according to an excessive concentration situation, and performing early warning notification on an excessive result in the excessive data lookup table based on the excessive early warning solution; and with the aid of a tencent cloud server, pushing early warning information to a relevant qualified department or a user unit through wechat, email and SMS in a real-time manner.

Preferably, performing data feature fusion based on the multi-source heterogeneous greenhouse/pollution gas data comprises:

firstly, using a long short-term memory (LSTM) to perform long-short term time feature extraction on historical data of satellite remote sensing and ground-based hyperspectral remote sensing, and fusing emission source intensity information from ground-based imaging observation and unmanned aerial vehicle observation during a predicted time to complete missing satellite remote sensing data and ground-based hyperspectral remote sensing data; and then, pre-processing all the multi-source heterogeneous greenhouse/pollution gas data, and then using convolutional neural network (CNN) to fuse the pre-processed multi-source heterogeneous greenhouse/pollution gas data so as to obtain the fusion results.

Preferably, using CNN to fuse the pre-processed multi-source heterogeneous greenhouse/pollution gas data comprises:

connecting the pre-processed multi-source heterogeneous data according to the number of channels to form multi-channel data, and then putting the multi-channel data into a multi-layer dense residual block network for multi-layer feature fusion, wherein the dense residual block network consists of a plurality of multi-layer dense residual blocks, and features extracted from an output of each layer are used as an input of each subsequent layer, that is, the features of each layer are reused and fused, so as to obtain a final fusion result.

Preferably, performing prediction of the greenhouse/pollution gas components at a future moment based on a fusion result comprises:

utilizing a residual network to respectively extract and then fuse the fusion result and short-time meteorological field data features predicted by a meteorological model, and predicting stereo distribution data of air pollutants at a future moment based on the fusion result.

Compared with the prior art, the present invention has at least the following beneficial effects:

Based on the multi-platform hyperspectral remote sensing technology, the air pollution/greenhouse gas distribution results with different spatial resolutions are obtained, and the entirely observation-based air pollution/greenhouse gas tracing and early warning system is established to improve the reliability of tracing and realize real-time monitoring of pollution/greenhouse gas excessive emissions. The stereo fusion and prediction system of multi-source heterogeneous data is established, and the hundred-meter-level stereo reconstruction and prediction of regional and urban scale air pollution/greenhouse gases are realized, which provides a new perspective for studying the physicochemical processes, environmental effects and climate effects of air pollution/greenhouse gases in three dimensions.

BRIEF DESCRIPTION OF THE DRAWINGS

In order to more clearly state technical schemes in embodiments of the present invention or the prior art, the following is a brief introduction of drawings required to be used in the description of the embodiments or the prior art. Obviously, the drawings described below are only some embodiments of the present invention. For a person skilled in the art, without creative labor, other drawings are also available based on these drawings.

DETAILED DESCRIPTION OF THE EMBODIMENTS

In order to make the purpose, technical schemes and advantages of the present invention more clearly understood, the present invention is further explained in detail in combination with the attached drawings and embodiments. It should be understood that the embodiments described herein are intended only to explain the present invention and do not limit the protection scope of the present invention.

Figure 1:
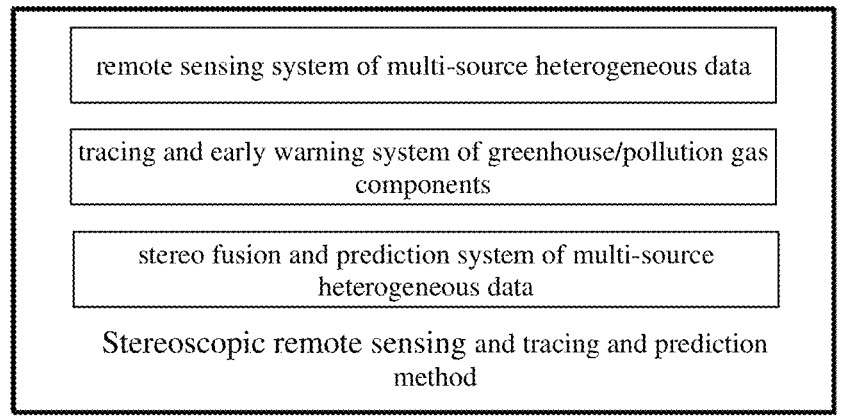
FIG. 1 is a schematic diagram of a method for whole-time space-air-ground integrated hyperspectral stereoscopic remote sensing, tracing and prediction of greenhouse/pollution gas provided by an embodiment.

As shown in FIG. 1, provided in an embodiment of the present invention is a method for whole-time space-air-ground integrated hyperspectral stereoscopic remote sensing, tracing and prediction of greenhouse/pollution gas, which comprises a remote sensing system of multi-source heterogeneous data, a tracing and early warning system of greenhouse/pollution gas components, and a stereo fusion and prediction system of multi-source heterogeneous data.

Figure 2:
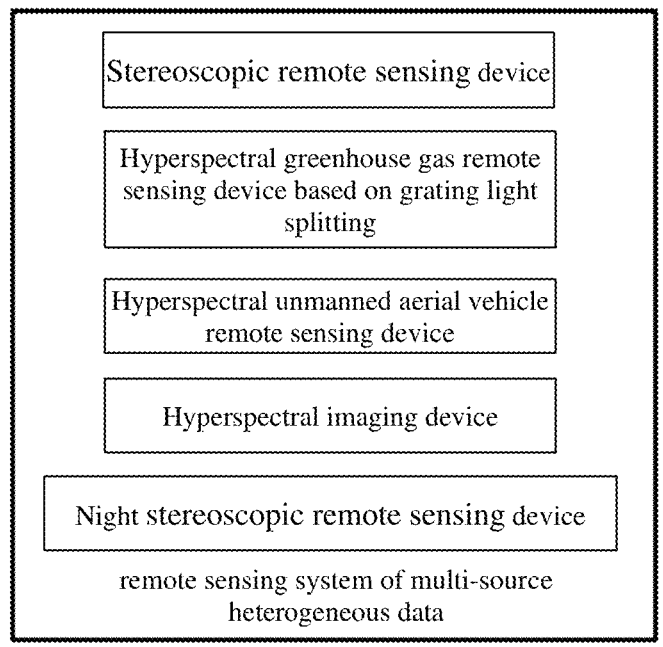
FIG. 2 is a schematic diagram of a remote sensing system of multi-source heterogeneous data provided by an embodiment.

In the embodiment, the remote sensing system of multi-source heterogeneous data is mainly used to collect multi-source heterogeneous greenhouse/pollution gas data. As shown in FIG. 2, the remote sensing system specifically comprises: utilizing a hyperspectral stereoscopic remote sensing device, a hyperspectral imaging device, a hyperspectral unmanned aerial vehicle remote sensing device, a hyperspectral greenhouse gas remote sensing device based on grating light splitting and a night hyperspectral stereoscopic remote sensing device to perform the remote sensing of the multi-source heterogeneous greenhouse/pollution gas data.

Vertical profiles of volatile organic compounds (VOCs) such as aerosol, $NO_2$, $SO_2$, HONO, $H_2O$, $O_3$ and HCHO and CHOCHO can be obtained by utilizing the hyperspectral stereoscopic remote sensing device. A vertical resolution of the vertical profiles is 100 m (0.0-4.0 km), and a time resolution is ≤15 min. Preferably, it can be obtained by an inversion method of vertical distribution of air pollution components based on optical remote sensing disclosed in an invention patent ZL202010611508.0. 0°-360° horizontal distributions of $NO_2$, $SO_2$, HONO and VOCs (aldehydes, ketones, esters and benzene series) can also be obtained, and minimum observation exposure time of a single azimuth angle is 3 seconds.

The hyperspectral imaging device is capable of realizing imaging of $NO_2$, $SO_2$, HONO, VOCs (aldehydes, ketones, esters and benzene series) as well as $CO_2$ and $CH_4$ of critical emission sources, wherein a spatial resolution is up to a meter-level, and scanning time of a single grid point is 3 seconds.

The meter-level resolution horizontal distribution of $NO_2$, $SO_2$, HONO, VOCs (aldehydes, ketones, esters and benzene series) as well as $CO_2$ and $CH_4$ in a critical area can be obtained by utilizing the hyperspectral unmanned aerial vehicle remote sensing device, wherein a time resolution of observation is 30 min. Preferably, it can be obtained by utilizing the unmanned aerial vehicle-borne hyperspectral remote sensing system for stereo distribution of air pollutants disclosed in the patent ZL202111441393.6.

The hyperspectral greenhouse gas remote sensing device based on the grating light splitting is capable of obtaining a vertical column concentration and a vertical profile of $CO_2$ and $CH_4$, wherein a spatial resolution of the profile is of a kilometer-level, and a time resolution is 10 min; and a horizontal spatial distribution of $CO_2$ and $CH_4$ at a regional scale can be obtained by mobile cruise.

The horizontal and vertical distributions of $NO_2$, $SO_2$, HONO, VOCs (aldehydes, ketones, esters and benzene series) as well as $CO_2$ and $CH_4$ at night can be obtained by utilizing a night hyperspectral stereoscopic remote sensing device, wherein a horizontal and vertical spatial resolution thereof is ≤10 m, and a time resolution is 30 min.

The multi-source heterogeneous greenhouse/pollution gas data obtained through remote sensing comprises:
(1) column concentration data of aerosol, $NO_2$, $SO_2$, HCHO, CHOCHO, $O_3$, $H_2O$, $CH_4$, $CO_2$ and other greenhouse/pollution gas components observed by hyperspectral satellite payloads such as EMI and TanSat;
(2) vertical profile data of a national ground-based hyperspectral air greenhouse/pollution component hyperspectral stereoscopic remote sensing network: aerosol, $NO_2$, $SO_2$, HCHO, CHOCHO, HONO, $H_2O$, $O_3$ and so on;
(3) hyperspectral horizontal remote sensing data: concentration distributions of $NO_2$, $SO_2$, HONO, aldehydes, ketones, esters, benzene series and other VOCs in different directions;
(4) hyperspectral imaging remote sensing data: imaging data of emission concentration distributions of $NO_2$, $SO_2$, HONO, $CO_2$, $CH_4$, aldehydes, ketones, esters, benzene series and other VOCs from major emission sources in different cities and areas;
(5) hyperspectral unmanned aerial vehicle remote sensing data: whole-time stereo distribution data of $NO_2$, $SO_2$, HONO, VOCs (aldehydes, ketones, esters and benzene series) and $CO_2$ and $CH_4$ from critical emission sources, cities or areas; and
(6) site data of China national environmental monitoring station (CNEMC): the data of CNEMC site is point concentration data, which has a limited role as a supplement to large-scope data, but due to the high reliability of its concentration, a matching degree between the overall data and true values can be greatly increased.

In the embodiment, the tracing and early warning system of greenhouse/pollution gas components fuses techniques such as hyperspectral satellite remote sensing, hyperspectral horizontal remote sensing, hyperspectral unmanned aerial vehicle remote sensing and hyperspectral imaging remote sensing and is used for progressively realizing tracing of greenhouse/pollution gas components at different locations based on the multi-source heterogeneous greenhouse/pollution gas data, and performing emission early warning according to a traced result.

Figure 3:
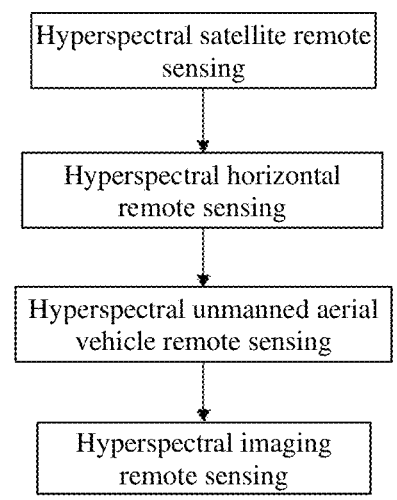
FIG. 3 is a flow chart of tracing of greenhouse/pollution gas components at different locations provided by an embodiment.

As shown in FIG. 3, progressively realizing tracing of greenhouse/pollution gas components at different locations based on the multi-source heterogeneous greenhouse/pollution gas data comprises:

Step 1: realizing kilometer-level identification of greenhouse/pollution gas components based on a hyperspectral satellite payload remote sensing technology. Specifically, this step is mainly to realize identification of the greenhouse/pollution air components such as aerosols, $NO_2$, $SO_2$, HCHO, CHOCHO, $O_3$, $CH_4$ and $CO_2$ at a kilometer-level of 1.0 km×1.0 km.

As for step 1, considering significant constraints of an aerosol vertical distribution on an air photon path, a 0.0 km to 4.0 km aerosol vertical profile obtained by a hyperspectral stereoscopic remote sensing device is combined with a 4.0 km to 10.0 km aerosol vertical profile simulated by a WRF-Chem model so as to be input into a radiation transmission model and obtain an accurate air photon path. An inversion accuracy of satellite products is about 30% higher than that of foreign satellite products, and ability of satellite remote sensing products to capture pollution hotspots is significantly improved.

Step 2: in a kilometer-level greenhouse/pollution gas component high value area determined by satellite payload remote sensing, carrying out hyperspectral horizontal remote sensing to realize hundred-meter-level horizontal distribution detection and high-value orientation identification of pollution gas components of $NO_2$, $SO_2$, HONO and VOCs, and form a record document. The VOCs pollution gases comprise aldehydes, ketones, esters and benzene series etc.

For step 2, a developed effective optical path $L_{eff}$ calculating algorithm based on $O_4$ optical characteristics changes significantly improves the accuracy of hyperspectral horizontal remote sensing, and a correlation compared with point sampling and vehicle-mounted cruise data is greater than 0.87. The effective optical path Ler is calculated by a formula (1):

$$L_{eff} = SCD_{O_4}/C_{O_4} = SCD_{O_4}/(C_{O_2})^2 = \{SCD_{O_4}/[0.020942 \times (P \times N_A)/(T \times R)]^2\} \quad (1)$$

In the formula (1), $SCD_{O_4}$, $C_{O_4}$ and $C_{O_4}$ respectively represent a skew column concentration of O4, an O4 concentration and an O2 concentration, P, T, R and $N_A$ respectively represent a pressure, a temperature, a molar gas constant and a Avogadro constant. Conversion of effective optical paths among different bands in the algorithm is realized based on a multi-order polynomial fitting shown in a formula (2):

$$L_{eff(\lambda_1)} = \beta_0 + \beta_1 L_{eff(\lambda_2)} + \beta_2 L_{eff(\lambda_2)}^2 + \ldots + \beta_n L_{eff(\lambda_2)}^n \quad (2)$$

In the formula (2), $\lambda$ is a wavelength, $\beta_0$ is a fitting intercept of the optical paths corresponding to different wavelengths, $\beta_1, \beta_2 \ldots \beta_n$ are 1st order, 2nd order . . . nth-order fitting coefficients, the algorithm can significantly improve a spatial resolution of horizontal remote sensing, and a concentration of a nth grid point is $$VMR_n = \frac{VMR_n \cdot L_{eff(\lambda_n)} - VMR_{n-1} L_{eff(\lambda_{n-1})}}{L_{eff(\lambda_n)} - L_{eff(\lambda_{n-1})}}.$$

The accuracy of hyperspectral horizontal remote sensing can be verified by comparing a point sampling result with a vehicle-mounted cruise result, and high-concentration grid points of hyperspectral horizontal remote sensing are target grid points.

step 3: in a hundred-meter-level greenhouse/pollution gas component high value grid point determined by horizontal remote sensing, carrying out hyperspectral unmanned aerial vehicle remote sensing to realize meter-level resolution detection of $NO_2$, $SO_2$, HONO, VOCs, $CO_2$ and $CH_4$ and determination of a location of an emission source.

For step 3, a threshold digital filtering algorithm and a bicubic B-spline surface data processing algorithm are fused to realize a reconstruction of the horizontal distribution of the greenhouse/pollution gas and improve positioning accuracy of hyperspectral unmanned aerial vehicle remote sensing (<1.0 m), wherein a grid point with a highest concentration is the location of emission source.

The threshold digital filtering algorithm is as follows: first, determining whether the concentration of the four adjacent grid points around each grid point is continuous; if there is a concentration mutation, setting the concentration of the grid point to 0; and then filling the concentration of the filtered grid points according to Gaussian diffusion.

On the basis of filtering with the threshold digital filtering algorithm, horizontal reconstruction is carried out for each grid point based on bicubic B-spline surface data processing.

$$S(u, v) = \sum_{k=0}^{3} \sum_{j=0}^{3} P_{kj} N_{k,4}(u) N_{j,4}(v) \quad (3)$$

In the formula (3), $N_{k,4}(u)$ and $N_{j,4}(v)$ are B-spline base functions, representing the pollution/greenhouse gas concentration, u and v are parameters, and P is a feature grid.

In the embodiment, according to an azimuth angle of the last column of each enterprise, it is also determined whether the enterprise is within 20 degrees deviating from a highest concentration azimuth angle, and a record document is formed.

step 4: at the location of the emission source determined by unmanned aerial vehicle remote sensing, carrying out hyperspectral imaging remote sensing to identify greenhouse/pollution gas components, emission fluxes and a diffusion range of the emission source, so as to realize accurate tracing of the greenhouse/pollution gas components and record it into the document.

For step 4, a Retinex algorithm, a median filtering algorithm and a Gaussian fuzzy algorithm are fused and a plume refinement reconstruction algorithm is used to realize high-precision identification of a plume boundary and an internal concentration, and finally, accurate tracing of the greenhouse/polluting gas components are realized.

The step of fusing the Retinex algorithm, median filtering algorithm and Gaussian fuzzy algorithm to develop the plume refinement reconstruction algorithm specifically comprises: utilizing the Retinex algorithm to remove influence of ambient light in a hyperspectral image and transform a gray-scale image; then utilizing the median filtering algorithm and the Gaussian fuzzy algorithm to perform median filtering and gaussian fuzzy on the transformed gray-scale image; and realizing high precision identification of the plume boundary and internal concentration after binarization. Quantification of greenhouse/pollution gas concentration $c_{ij}$ in the plume is based on a formula (4):

$$c_{ij} = \frac{k \cdot M \cdot VCD_{ij}}{h_{ij} \cdot N_A} \tag{4}$$

In the formula (4), k is a unit conversion coefficient, and the value thereof is $k=1.0 \times 10^{10}$, M is a relative molecular mass of trace gas (g/mol), $N_A$ is the Avogadro constant ($mol^{-1}$), h is a calculation height (m), VCD is a vertical column concentration of trace gas (molec $cm^{-2}$), i and j are index numbers of the azimuth angles and elevation angles respectively), and finally the accurate tracing of the greenhouse/pollution gas components is realized.

Quantification of greenhouse/pollution gas emission fluxes Flux is realized based on a formula (5):

$$\text{Flux} = \frac{c_i \cdot (\pi \cdot r^2) \cdot \Delta x \cdot \sin \alpha}{\Delta t} = c_i \cdot (\pi \cdot r^2) \cdot v_{wind} \cdot \sin \alpha \tag{5}$$

In the formula (5), r, $v_{wind}$ and $\alpha$ are respectively a plume radius (m), a wind speed (m $s^{-1}$), an azimuth angle and a clip of wind direction.

Evaluation of a diffusion range of trace gas plume is based on a formula (6):

$$c_{ij} = e^{-\frac{t}{\tau}} \times c_{emission} \tag{6}$$

In the formula (6), t is diffusion time, $\tau$ is the life of trace gas, and $c_{emission}$ is an exhaust concentration.

On the basis of the tracing in the above steps (a)-(d), the emission early warning is carried out according to the traced result, comprising: based on emission related standards (Comprehensive Emission Standard for Air Pollutants (GB 16297-1996), Emission Standard for Coking Chemical Industry Pollutants (GB 16171-2012), etc.) and target source emission historical data (exhaust hyperspectral imaging historical data), constructing a multi-source data traversal method system and a multi-component historical excessive emission data lookup table of the greenhouse/pollution air components, which comprises information such as time, process flow names, pollution/greenhouse gas components and corresponding excessive emission concentrations, wherein the determination of excessive emission is based on the above specifications and standards; and establishing excessive emission early warning solution having three levels of orange, red and purple according to an excessive concentration situation, wherein the orange early warning means that the emission concentration is 1-2 times of an average historical excessive concentration, the red early warning means that the emission concentration is 2-3 times of the average historical excessive concentration, and the purple early warning means that the emission concentration is 3 times of the average historical excessive concentration. Under a premise of meeting legal requirements, a Tencent Cloud server is capable of pushing early warning information to departments or a user unit with relevant qualifications through wechat, email and SMS in a real-time manner, and the timeliness of automatic early warning may reach a minute level.

Figure 4:
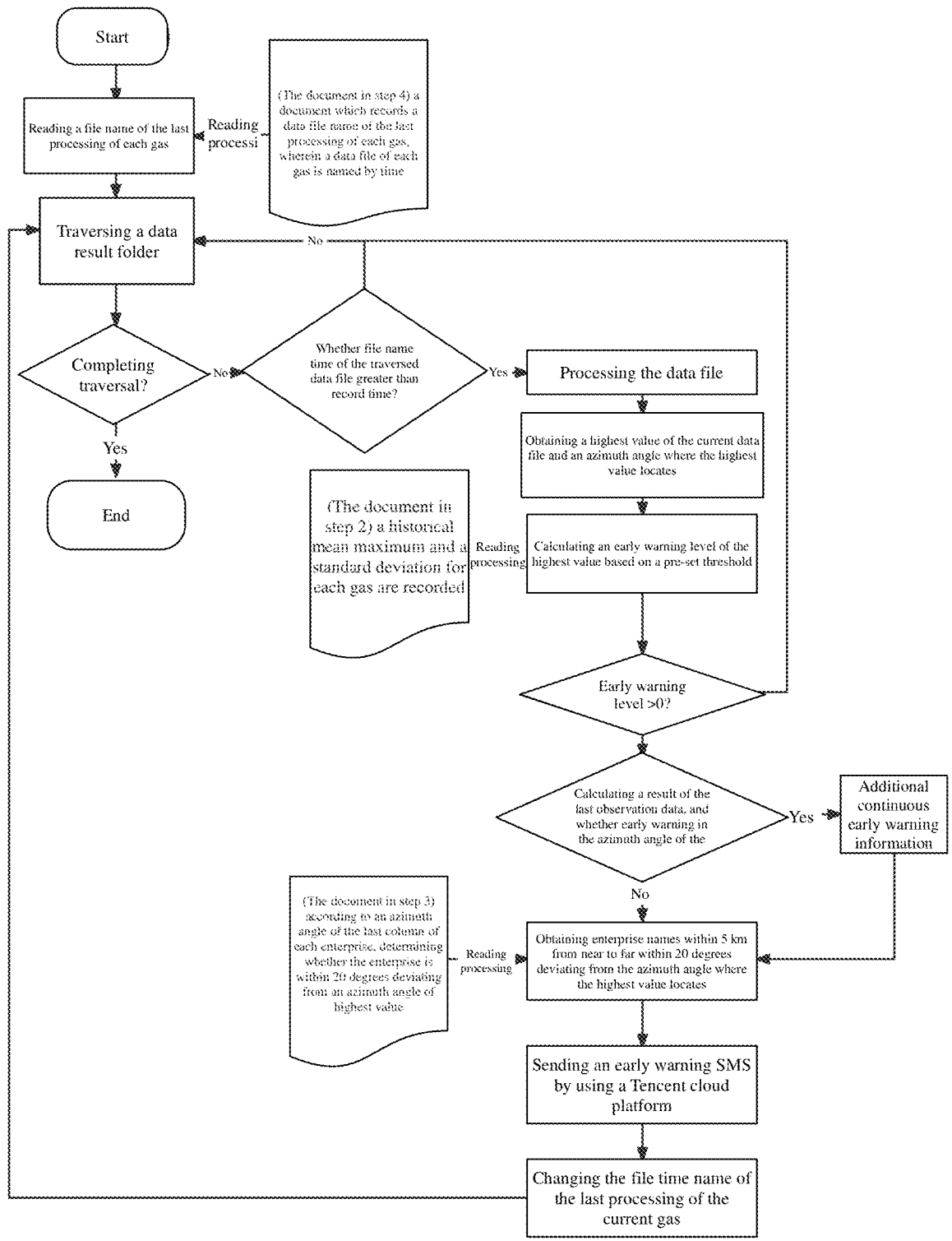
FIG. 4 is a flow chart of emission early warning according to a traced result provided by an embodiment.

As shown in FIG. 4, in an example, a specific process of emission early warning according to a traced result comprises: performing automatic early warning while checking once every 1 minute. First, a file name of the last processing of each gas is read from the record document in step 4, and then a data result folder is traversed. If the name of a folder currently traversed is greater than record time of the document, then the data file is processed to obtain its highest concentration value and an azimuth angle where the highest concentration value is located. Then a historical average maximum value and a standard deviation of each gas specified in the document in step 2 are read, and an early warning level of the highest concentration value is judged according to preset early warning thresholds at all levels. If the early warning level=0, no early warning is required, and it is continued to traverse the data results. If the early warning level is greater than 0, then it is calculated whether the gas in the last observation data in the orientation has an early warning. If there is any, continuous early warning information is attached, and then the enterprise information document in step 3 is read so as to obtain enterprise names from near to far within 20 degrees deviating from the azimuth angle within 5 km. Finally, the early warning information is sent by using a Tencent cloud SMS platform, and the time of the last processing of the current gas is updated to the time file name of current process.

In the embodiment, the stereo fusion and prediction system of multi-source heterogeneous data is used to perform data feature fusion based on the multi-source heterogeneous greenhouse/pollution gas data, and perform prediction of the greenhouse/pollution gas components at a future moment based on a fusion result.

Figure 5:
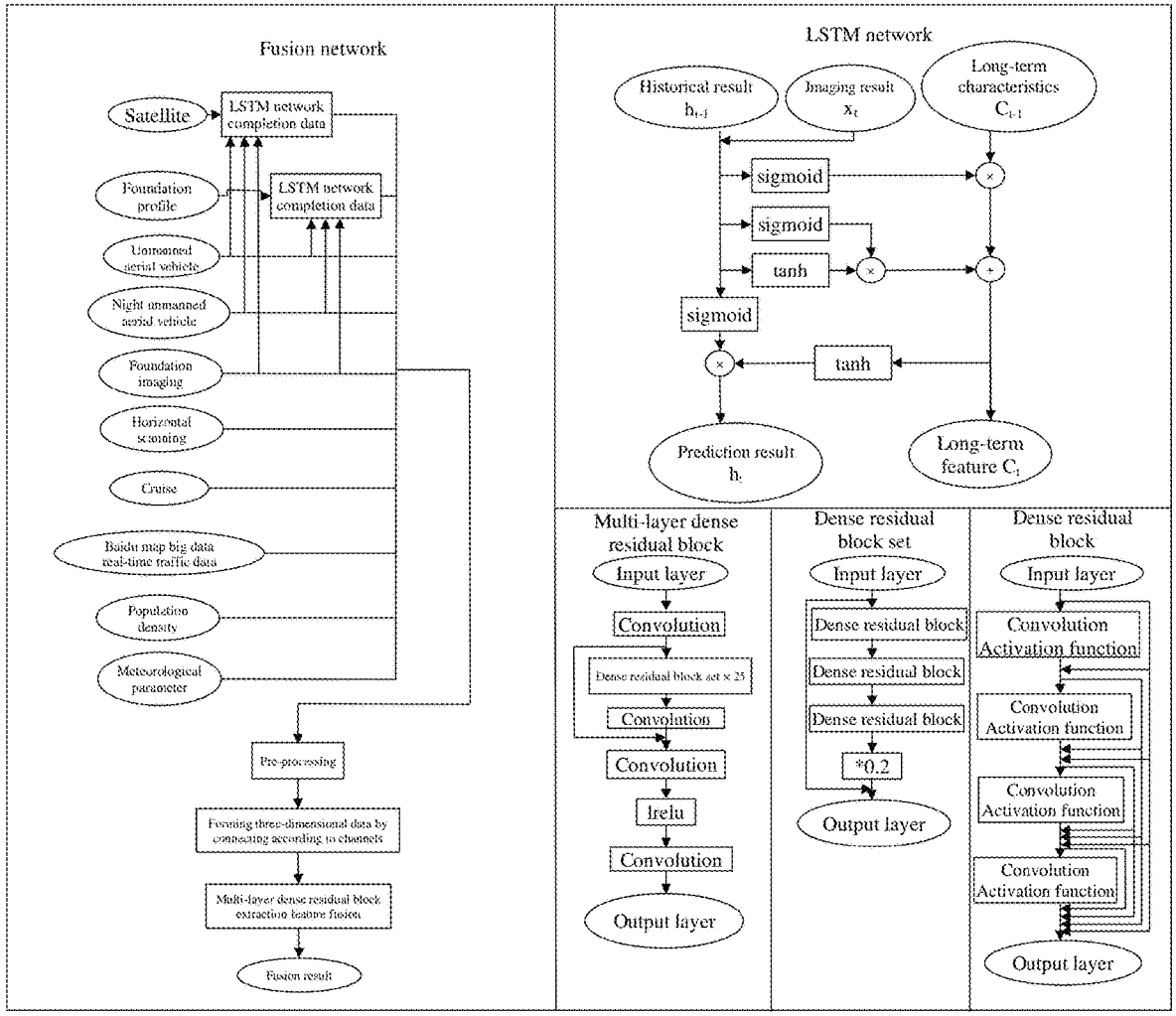
FIG. 5 is a flow chart of feature fusion of multi-source heterogeneous data provided by an embodiment.

As shown in FIG. 5, the data feature fusion is performed based on multi-source heterogeneous greenhouse/pollution gas data. A long short-term memory (LSTM) artificial neural network and a convolutional neural network (CNN) are used to fuse the above multiple types of multi-source asynchronous data. A specific process thereof is as follows: firstly, using LSTM to perform long-short term time feature extraction on historical data of satellite remote sensing and ground-based hyperspectral remote sensing, and fusing emission source intensity information from ground-based imaging observation and unmanned aerial vehicle observation during a predicted time to complete missing satellite remote sensing data and ground-based hyperspectral remote sensing data; and then, pre-processing all the multi-source heterogeneous greenhouse/pollution gas data, and then using CNN to fuse the pre-processed multi-source heterogeneous greenhouse/pollution gas data so as to obtain the fusion result. The dense residual block network consists of a plurality of multi-layer dense residual blocks, and features extracted from an output of each layer are used as an input of each subsequent layer, that is, the features of each layer are reused and fused, so as to obtain a final fusion result. The air remote sensing data obtained by this method has higher resolution and wider time coverage.

Since the data types, units and structures of various observation data are all different, it is necessary to pre-process different types of multi-source heterogeneous data so that they are in the same spatio-temporal resolution. For example, the resolution of satellite data is low, so it is necessary to calibrate its grid to match with the high-resolution data on the ground. At the same time, the satellite observation data is the air column concentration, so it is necessary to use a chemical transmission model to calculate a corresponding scale factor so as to obtain a near-ground concentration thereof. Similarly, other types of data should also be converted into high-resolution data on the ground.

Figure 6:
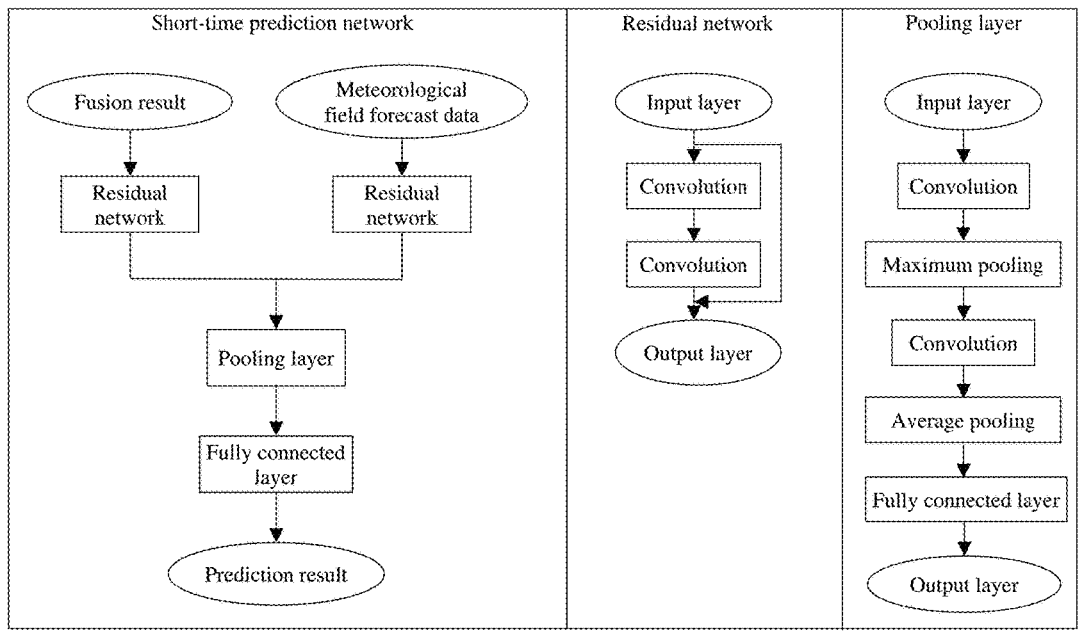
FIG. 6 is a flow chart for predicting greenhouse/pollution gas components at a future moment provided by an embodiment.

As shown in FIG. 6, the greenhouse/pollution gas components at a future moment based on the fusion result, further comprising: utilizing a residual network to respectively extract and then fuse the fusion result and short-time meteorological field data features predicted by a meteorological model, and then predicting stereo distribution data of air pollutants in a short term such as 1 to 2 days based on a fusion result.

Figure 7:
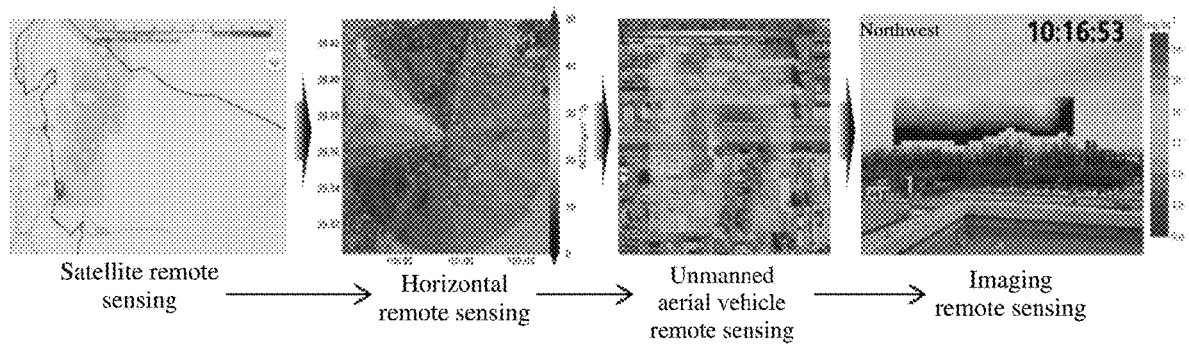
FIG. 7 is a result diagram of a tracing example provided by an embodiment.

The embodiment also gives an example of tracing and early warning of greenhouse/pollution gas components using the above method, as shown in FIG. 7. Precise positioning of $NO_2$ emission source is realized, and real-time early warning of $NO_2$ emission from the target enterprise is realized. Specifically, firstly, based on hyperspectral satellite payload EMI, a kilometer-level $NO_2$ high-value area is captured; after investigation, it is found that there are a plurality of industrial parks emitting $NO_2$ in the kilometer-level area; hyperspectral horizontal remote sensing devices are set up in main industrial parks, and a high-value orientation of $NO_2$ is identified to be the northwest through 360° all-round horizontal observation; then, by carrying out meter-level spatial resolution hyperspectral unmanned aerial vehicle remote sensing in this orientation, a coal-fired power plant with high concentration of $NO_2$ is located; and hyperspectral imaging is carried out on the target coal-fired power plant, and the real-time $NO_2$ plume concentration and emission fluxes are successfully captured. Based on the early warning technology, it is confirmed that the early warning thresholds of three levels of orange, red and purple of $NO_2$ of excessive emission are 32 mg/m3, 43 mg/m3 and 54 mg/m3 respectively. On this basis, hierarchical early warning of $NO_2$ emissions from the coal-fired power plant is realized, and the early warning information is sent to an environmental protection law enforcement department in real time, which is used as one of reference technologies for law enforcement.

Figure 8:
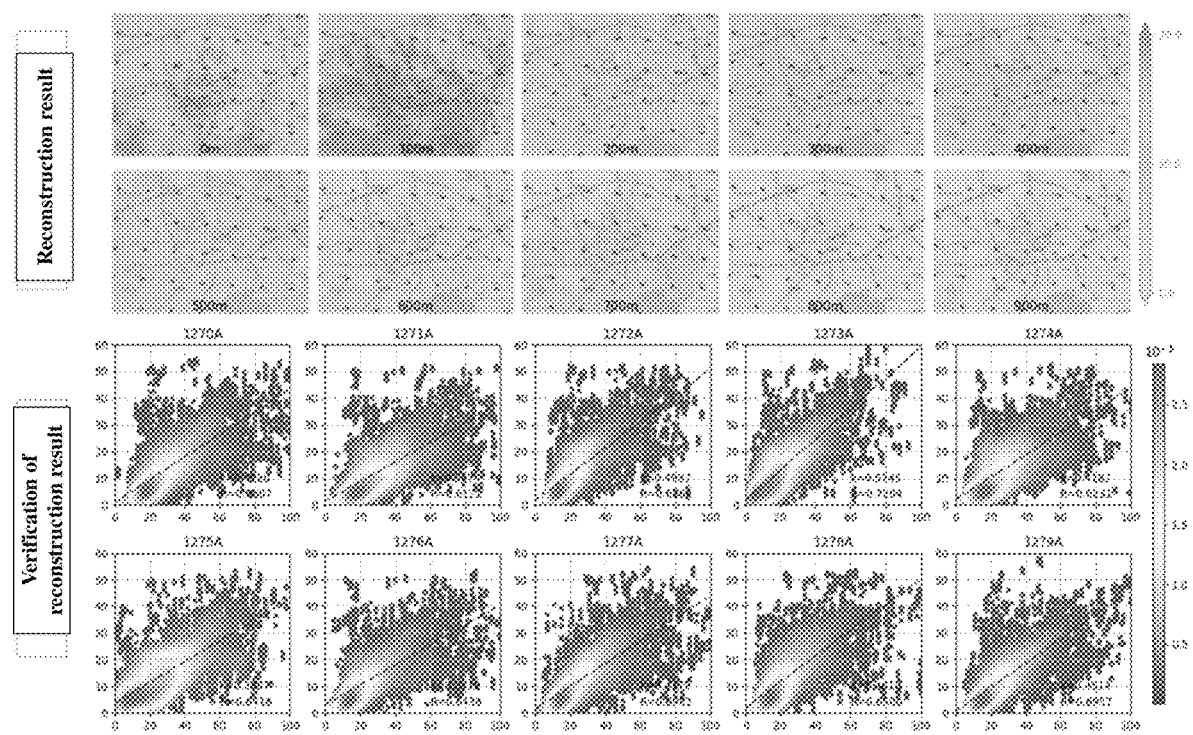
FIG. 8 is a result diagram of a prediction example provided by an embodiment.

The embodiment also gives a prediction example using the stereo fusion and prediction system of the above multi-source heterogeneous data. As shown in FIG. 8, the hyperspectral satellite data, hyperspectral vertical remote sensing data, hyperspectral horizontal remote sensing data, hyperspectral unmanned aerial vehicle remote sensing data, hyperspectral imaging remote sensing data and national control station data are fused. The reconstruction of $NO_2$ stereo distribution with a spatial resolution of 100 m×100 m in Hefei City is realized. In the reconstruction results, it can be found that the high values of $NO_2$ are mainly distributed below 100 m, and the high value area corresponds to an industrial area and an area with heavy traffic. Each of the correlations among the reconstructed results and the observed results is more than 0.6.

The above embodiments describe in detail the technical schemes and beneficial effects of the present invention. It should be understood that the above embodiments are only the most preferred embodiments of the present invention and are not used to limit the present invention. Any modification, supplement and equivalent replacement made within the scope of the principle of the present invention shall be included within the protection scope of the present invention.

What is claimed is:

1. A method for whole-time space-air-ground integrated hyperspectral stereoscopic remote sensing, tracing and prediction of greenhouse/pollution gas, the method comprising:
    performing remote sensing of multi-source heterogeneous data: utilizing a hyperspectral stereoscopic remote sensing device, a hyperspectral imaging device, a hyperspectral unmanned aerial vehicle remote sensing device, a hyperspectral greenhouse gas remote sensing device based on grating light splitting and a night hyperspectral stereoscopic remote sensing device to perform the remote sensing of and obtain the multi-source heterogeneous greenhouse/pollution gas data, comprising: hyperspectral satellite remote sensing data, hyperspectral ground-based remote sensing data, hyperspectral horizontal remote sensing data, hyperspectral imaging remote sensing data, hyperspectral unmanned aerial vehicle remote sensing data, and environmental monitoring station site data;
    performing tracing and early warning of greenhouse/pollution gas components: progressively realizing tracing of greenhouse/pollution gas components at different locations based on the multi-source heterogeneous greenhouse/pollution gas data, comprising:
    step 1: realizing kilometer-level identification of the greenhouse/pollution gas components based on a hyperspectral satellite payload remote sensing technology;
    step 2: in a kilometer-level greenhouse/pollution gas component high value area determined by satellite payload remote sensing, carrying out hyperspectral horizontal remote sensing to realize hundred-meter-level horizontal distribution detection and high-value orientation identification of the greenhouse/pollution gas components;
    step 3: in a hundred-meter-level greenhouse/pollution gas component high value grid point determined by horizontal remote sensing, carrying out hyperspectral unmanned aerial vehicle remote sensing to realize meter-level resolution detection of the greenhouse/pollution gas components and determination of a location of an emission source; and,
    step 4: at the location of the emission source determined by unmanned aerial vehicle remote sensing, carrying out hyperspectral imaging remote sensing to identify greenhouse/pollution gas components, emission fluxes and a diffusion range of the emission source, so as to realize accurate tracing of the greenhouse/pollution gas components;
    performing emission early warning according to a traced result, comprising: constructing a multi-source data traversal method system and a multi-component historical excessive emission data lookup table of the greenhouse/pollution air components based on an emission specification standard and historical emission data of a target source, wherein the lookup table includes time, process flow names, pollution/greenhouse gas components and corresponding excessive emission concentrations, and determination of excessive emission is based on the emission specification standard; establishing an excessive emission early warning solution having three levels of orange, red and purple according to an excessive concentration situation, and performing early warning notification on an excessive result in the excessive data lookup table based on the excessive early warning solution; and, with the aid of a TENCENT cloud server, pushing early warning information to a relevant qualified department or a user unit through wechat, email and SMS in a real-time manner; and performing stereo fusion and prediction of the multi-source heterogeneous data: performing data feature fusion based on the multi-source heterogeneous greenhouse/pollution gas data, comprising: firstly, using Long Short-Term Memory (LSTM) to perform long-short term time feature extraction on historical data of satellite remote sensing and ground-based hyperspectral remote sensing, and fusing emission source intensity information from ground-based imaging observation and unmanned aerial vehicle observation during a predicted time to complete missing satellite remote sensing data and ground-based hyperspectral remote sensing data; and then, pre-processing all the multi-source heterogeneous greenhouse/pollution gas data, and then using Convolutional Neural Networks (CNN) to fuse the pre-processed multi-source heterogeneous greenhouse/pollution gas data so as to obtain a fusion result;

performing prediction of the greenhouse/pollution gas components at a future moment based on the fusion result, comprising: utilizing a residual network to respectively extract and then fuse the fusion result and short-time meteorological field data features predicted by a meteorological model, and predicting stereo distribution data of air pollutants at a future moment based on the fusion result.

2. The method for whole-time space-air-ground integrated hyperspectral stereoscopic remote sensing, tracing and prediction of greenhouse/pollution gas according to claim 1, wherein the hyperspectral stereoscopic remote sensing device is capable of obtaining a vertical profile of the greenhouse/pollution gas, wherein a vertical resolution of the vertical profile is 1 meter to 100 meters, a time resolution is ≤15 minutes, and the hyperspectral stereoscopic remote sensing device is also capable of obtaining a horizontal distribution of 0° to 360° of the greenhouse/pollution gas, wherein observation exposure time of a single azimuth angle is ≤3 seconds;

the hyperspectral imaging device is capable of realizing imaging of the greenhouse/pollution gas from a critical emission source, wherein a spatial resolution is up to a meter-level, and scanning time of a single grid point is ≤3 seconds;

the hyperspectral unmanned aerial vehicle remote sensing device is capable of obtaining a horizontal distribution of a meter-level resolution of the greenhouse/pollution gas in a critical area, wherein an observation time resolution is ≤30 minutes;

the hyperspectral greenhouse gas remote sensing device based on the grating light splitting is capable of obtaining a vertical column concentration and a vertical profile of $CO_2$ and $CH_4$, wherein a spatial resolution of the profile is of a kilometer-level, and a time resolution is ≤10 minutes; and the night hyperspectral stereoscopic remote sensing device is capable of obtaining a horizontal distribution and a vertical distribution of greenhouse/pollution gas at night, wherein a horizontal and vertical spatial resolution thereof is ≤10 meters, and a time resolution is ≤30 minutes.

3. The method for whole-time space-air-ground integrated hyperspectral stereoscopic remote sensing, tracing and prediction of greenhouse/pollution gas according to claim 1, wherein in the step 2, hyperspectral horizontal remote sensing is realized based on an effective optical path calculation algorithm of $O_4$ optical characteristics changes: the effective optical path $L_{ef}$ is calculated by a formula (1):

$$L_{ef} = SCD_{O_4}/C_{O_4} = SCD_{O_4}/(C_{O_2})^2 = \{SCD_{O_4}/[0.020942 \times (P \times N_A)/(T \times R)]^2\} \quad (1)$$

in the formula (1), $SCD_{O_4}$, $C_{O_4}$ and $C_{O_2}$ respectively represent a skew column concentration of $O_4$, an $O_4$ concentration and an $O_2$ concentration, P, T, R and $N_A$ respectively represent a pressure, a temperature, a molar gas constant and a Avogadro constant; conversion of effective optical paths among different bands in the algorithm is realized based on a multi-order polynomial fitting shown in a formula (2):

$$L_{ef(\lambda_1)} = \beta_0 + \beta_1 L_{ef(\lambda_2)} + \beta_2 L_{ef(\lambda_2)}^2 + \ldots + \beta_n L_{ef(\lambda_2)}^n \quad (2)$$

in the formula (2), $\lambda$ is a wavelength, $\beta_0$ is a fitting intercept of the optical paths corresponding to different wavelengths, $\beta_1$, $\beta_2$ ... $\beta_n$ are 1st order, 2nd order ... nth-order fitting coefficients, the algorithm significantly improve a spatial resolution of horizontal remote sensing, and a concentration of a $n^{th}$ grid point is $$VMR_n = \frac{VMR_n \cdot L_{ef(\lambda_n)} - VMR_{n-1} L_{ef(\lambda_{n-1})}}{L_{ef(\lambda_n)} - L_{ef(\lambda_{n-1})}}.$$

4. The method for whole-time space-air-ground integrated hyperspectral stereoscopic remote sensing, tracing and prediction of greenhouse/pollution gas according to claim 1, wherein in the step 3, a threshold digital filtering algorithm and a bicubic B-spline surface data processing algorithm are fused to realize a reconstruction of the horizontal distribution of the greenhouse/pollution gas, a grid point with a highest concentration is the location of emission source.

5. The method for whole-time space-air-ground integrated hyperspectral stereoscopic remote sensing, tracing and prediction of greenhouse/pollution gas according to claim 1, wherein in the step 4, after a Retinex algorithm, a median filtering algorithm and a Gaussian fuzzy algorithm are fused to process the data, a plume refinement reconstruction algorithm is used to realize high-precision identification of a plume boundary and an internal concentration, comprising: quantification of greenhouse/pollution gas concentration in the plume, quantification of greenhouse/pollution gas emission fluxes and evaluation of a diffusion range of trace gas plume.

6. The method for whole-time space-air-ground integrated hyperspectral stereoscopic remote sensing, tracing and prediction of greenhouse/pollution gas according to claim 1, wherein using the CNN to fuse the pre-processed multi-source heterogeneous greenhouse/pollution gas data comprises:

connecting the pre-processed multi-source heterogeneous data according to a number of channels to form multi-channel data, and then putting the multi-channel data into a multi-layer dense residual block network for multi-layer feature fusion, wherein the dense residual block network consists of a plurality of multi-layer dense residual blocks, and features extracted from an output of each layer are used as an input of each subsequent layer, that is, the features of each layer are reused and fused, so as to obtain a final fusion result.

* * * * *